US008346006B1

(12) United States Patent
Darbari et al.

(10) Patent No.: US 8,346,006 B1
(45) Date of Patent: Jan. 1, 2013

(54) REAL TIME AUTO-TAGGING SYSTEM

(75) Inventors: Abhinav Darbari, Singrauli (IN); Ramesh P B, Uttar Pradesh (IN)

(73) Assignee: Adobe Systems Incorporated, San Jose, CA (US)

( * ) Notice: Subject to any disclaimer, the term of this patent is extended or adjusted under 35 U.S.C. 154(b) by 1094 days.

(21) Appl. No.: 12/212,006

(22) Filed: Sep. 17, 2008

(51) Int. Cl.
*G06T 5/00* (2006.01)

(52) U.S. Cl. ........................................ 382/260; 382/303

(58) Field of Classification Search ........................ None
See application file for complete search history.

(56) References Cited

U.S. PATENT DOCUMENTS

| | | | |
|---|---|---|---|
| 5,710,829 A * | 1/1998 | Chen et al. | 382/173 |
| 5,881,181 A * | 3/1999 | Ito | 382/274 |
| 6,125,210 A * | 9/2000 | Yang | 382/240 |
| 6,587,589 B1 * | 7/2003 | Chen et al. | 382/240 |
| 6,591,398 B1 * | 7/2003 | Kondo et al. | 714/2 |
| 6,940,897 B2 * | 9/2005 | Shaikh | 375/232 |
| 2007/0116374 A1 * | 5/2007 | Despain | 382/261 |

* cited by examiner

*Primary Examiner* — Brian P Werner
(74) *Attorney, Agent, or Firm* — Kilpatrick Townsend & Stockton LLP

(57) ABSTRACT

Methods and apparatus provide for an output manager that receives an identification of content. The output manager receives an identification of a set of filters to be applied to the content where each filter in the set of filters defines a sequence of steps to be applied to the content. The output manager identifies shared steps that are common to the sequence of steps of at least two filters in the set of filters. Thus, upon a first execution of a shared step in a sequence of steps by a filter, the output manager caches output of the first execution to be used in place of execution of that shared step in a sequence of steps of another filter in the set of filters.

24 Claims, 11 Drawing Sheets

REAL TIME AUTO-TAGGING SYSTEM

BACKGROUND

Users take more photographs, audio, and video with digital cameras and camcorders (as well as cell phones) now than ever before. In the past, the primary disadvantage to acquiring large amounts of digital content was a lack of inexpensive storage devices available, particularly if a user acquired the content in a high resolution format. Advances in storage technology have resulted in greater amounts of storage being sold at a lower cost, such that it is now possible to purchase many gigabits of storage for a few hundred dollars, sometimes less. As a result, a situation has emerged where most users of digital devices have so much acquired content it is hard for them to easily organize and make sense of it all.

A number of software applications are available that allow a user to preview and navigate their digital content wherever that content may be stored, and then edit it, share it, and produce the content in a variety of ways. Even operating systems, such as the Microsoft® Windows® family of operating systems (Microsoft and Windows are trademarks of Microsoft Corporation of Redmond, Wash., U.S.A.), include an automatic preview of a folder containing digital images by providing thumbnails of the images contained within a folder. Other applications may create previews in their own particular ways, such as by showing a number of condensed-sized thumbnails of digital images, a short clip of a longer video file, or a short clip of a longer audio file.

Operating systems, as well as digital content acquisition applications that come bundled with a digital camera/camcorder, allow a user to identify elements of digital content when a user downloads that content from a source (i.e., a digital camera, camera phone, digital camcorder or other video recorder, memory device located in a digital device, and so on) to a computer. This is a manual process that involves the user typing, or otherwise providing, the descriptive information to the application. These applications thus allow a user to preview and search through digital content. Some information about the digital content may be produced by the capturing device itself, and is then acquired by the application. For example, a digital camera may encode, within a digital image captured by the camera, the type of camera used to capture the image, as well as the time and date on which the image was captured, the size of the image in bytes, the settings used by the camera when capturing the image, and so on.

Many software applications allow a user to edit digital content. As an example, many photo printing applications allow a user to process digital images before printing by applying image processing techniques to those images. As a specific example, if a person in a digital image has redness in his or her eyes in the image, the user may apply a redeye filter to the image to remove the redness from the person's eyes before printing the photo.

BRIEF DESCRIPTION

Conventional mechanisms for describing and editing digital content in a large library of digital content suffer from a variety of deficiencies. One such deficiency is that creating the description for a desired portion of content is a manual process that may take a substantial amount of time to create. In some cases, when a user wishes to create data that describes an attribute of a portion of content among multiple portions of content, the user must manually search for the desired portion of content, manually enter information describing attributes of the desired portion of content and then associate the data with the desired portion of content. If the user is working with a large library of digital content, such an approach is time consuming and prone to errors.

Some conventional systems provide the capability to automatically recognize various attributes of portions of content. However, when processing large numbers of portions of content, such conventional systems must consume vast amounts of processing resources and memory as the same attribute recognition procedures are repetitively performed on each portion of content.

In conventional content editing systems, a user may be able to apply a filter such as redeye remover to one or more digital images. The user may also be able to apply other filters to the same image. Application of filters can be used to adjust (or detect within) the image (e.g. a digital photo or frame of video) for such factors as brightness, focus, contrast and so forth. Each filter involves various digital processing algorithms to adjust the picture to accomplish to overall goal of that filter. A filter(s) can either be used for editing the image, or for detection attributes or characteristics of an image in order to classify the image.

Techniques discussed herein significantly overcome the deficiencies of conventional applications such as those discussed above. As will be discussed further, certain embodiments herein are directed to an output manager that reduces redundancies encountered by repetitively executing similar procedures during automatic detection or editing of attributes of multiple portions of content.

As an example, conventional software programs that allow for editing or categorizing via description of digital content do not reduce redundancies between processing of different filters. As an example, if a user of a conventional application applies a filter to digital content to adjust or detect brightness in an image (e.g. a photo or vide frame), that filter may require performing various processing steps to the image. If the user of same conventional application then decides to apply a focusing filter to the same image, the conventional application will apply a sequence of steps to focus the image (or to detect focus level in the image). It may be the case that some of the steps involved in adjusting or detecting image brightness (the first filter that the user applied) are common to the filter to adjust or detect focus level in an image (the second filter). However, conventional software programs that employ such digital image processing techniques do not take advantage of the fact that each filter may have common steps involved in image processing.

The system, methods and techniques described herein are based in part on recognizing that application of multiple digital content processing techniques (e.g. filters) to digital content may involve applying a sequence of filters to such content that share commons steps. Thus application of a brightness adjustment or detection filter may involve one or more processing steps that are common to another filter such as a focus filter use to detect or edit focus of an image. As a result, the system disclosed herein is able to perform steps in a given first filter and if those same steps (one or more) are used in other filters that the user has selected for application to the same content, the results of those steps shared in common between two or more filters can be cached so that the processing of that step on that same image by a second filter does not need to be performed during processing of that second filter. Thus the second filter does not consume as much processing resources since shared step output is already available (via application of that same step in a previously applied filter to the same content).

For example, the output manager receives a set of filters to be applied to portions of content, such as a sequence of video frames. Each filter is a unique content analysis or editing filter that consists of certain steps (i.e. operations, procedures, etc.) that can process data associated with a given video frame. Each filter processes data associated with a given video frame to detect a particular attribute of that video frame. However, while each filter is unique and is capable of detecting a specific video frame attribute, a particular step may be common in any number of the filters. Thus, if three filters share the same type of step, conventional systems require the "shared step" to be executed three separate times for the same video frame.

Prior to applying the filters to the sequence of video frames, the output manager identifies all various shared steps amongst the filters. The output manager partitions the set of filters into multiple subsets of filters. The output manager partially executes each filter in a first subset of filters in a parallel fashion. As the filters in the first subset execute, one filter will eventually be the first filter to execute a "shared step" while processing a particular video frame. The output manager stores the output created during that shared step's first execution in a cache, along with an identifier for the particular video frame.

When another filter that consists of the same "shared step" processes the same particular video frame, the output manager uses the cached output in place of executing that filter's "shared step." When partial execution of each filter in the first subset of filters is complete, the output manager discards all cached output created by any first execution of "shared steps" in order to have enough memory space to store output from a partial execution of filters in a second subset of filters.

With the execution of the filters in the first subset of filters suspended, the output manager partially executes each filter in a second subset of filters in a similar manner as described above. As the filters in the second subset execute, one filter will eventually be the first filter from those filters in the second subset to execute a "shared step" while processing a particular video frame. The output manager stores the output created during that shared step's first execution in the cache, along with an identifier for the particular video frame.

When another filter from the second subset that consists of the same "shared step" processes the same particular video frame, the output manager uses the cached output in place of executing that filter's "shared step." When parallel partial execution of each filter in the second subset of filters is complete, the output manager again discards all cached output created by any first execution of "shared steps" of the filters in the second subset of filters.

With the cache clear of output from "shared steps" executed by filters in the second subset of filters, the output manager returns to the first subset of filters and resumes parallel execution of each filter in the first subset of filters. Again, as the output manager continues the execution of each filter in the first subset, one filter will eventually be the first filter—since execution of filters in the first subset was resumed—to execute a "shared step" with regard to a particular video frame. However, although the filter is performing the "shared step" for the first time since execution was resumed, the output manager detects that all the other filters in the first subset that also consist of the "shared step" have already performed the "shared step," so no other filters in the first subset will actually need the output. Thus, the output manager will not store output for that "shared step" in the cache.

The output manager can complete execution of each filter in the first subset of filters and return to the second subset of filters to resume and further the execution of the partially executed filters in the second subset. In the alternative, instead of completely executing each filter in the first subset of filters, the output manager can again suspend execution the first subset of filters and return to the second subset of filters to resume execution of those filters in the second subset in the manner already discussed above.

Specifically, in various embodiments, the output manager receives an identification of content. The output manager receives an identification of a set of filters to be applied to the content where each filter in the set of filters defines a sequence of steps to be applied to the content. The output manager identifies shared steps that are common to the sequence of steps of at least two filters in the set of filters. Thus, upon a first execution of a shared step in a sequence of steps by a filter, the output manager caches output of the first execution to be used in place of execution of that shared step in a sequence of steps of another filter that has yet to execute that shared step.

In one embodiment, the output manager detects a shared step by identifying a particular step (in a sequence of steps of a filter) whose execution can be replaced by modifying output created from execution of a step in a sequence of steps of another filter.

In yet another embodiment, the output manager detects a shared step by identifying a particular step (in a sequence of steps of a filter) whose execution can be optimized by processing output of a step in a sequence of steps of another filter during execution of the particular step.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium (e.g., tangible computer-readable medium) including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in software and hardware such as those manufactured by Adobe Systems Incorporated of San Jose, Calif., U.S.A., herein after referred to as "Adobe" and "Adobe Systems."

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note also that this Brief Description section herein does not specify every embodiment and/or incrementally novel aspect of the present disclosure or claimed invention. Instead, this Brief Description only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of embodiments of the methods and apparatus for an output manager, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

DETAILED DESCRIPTION

Figure 1:
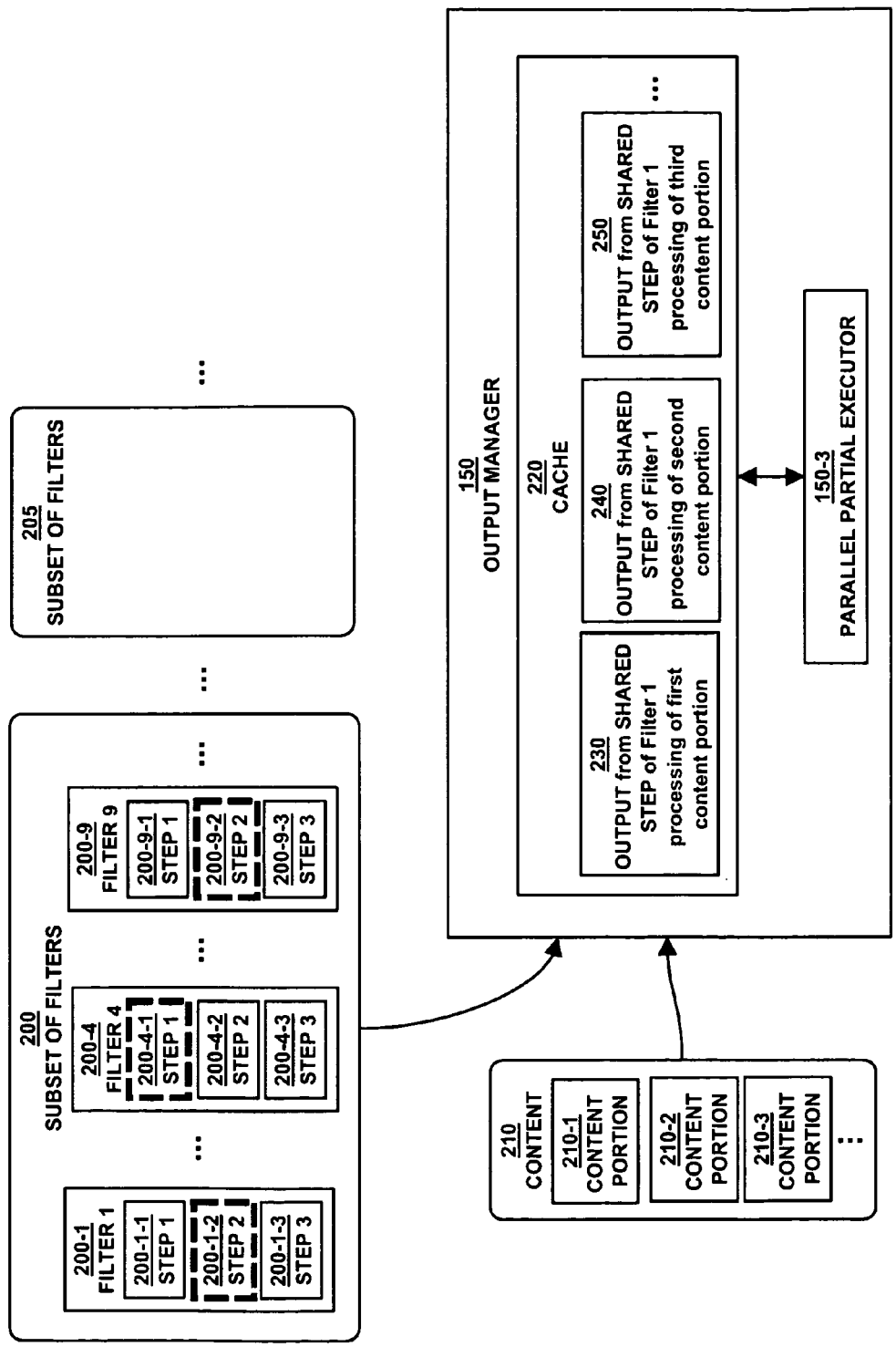
FIG. 1 is an example block diagram of an output manager caching output from a first execution of a shared step included in a filter of a first subset of filters according to embodiments herein.

Methods and apparatus provide for an output manager that receives an identification of content. The output manager receives an identification of a set of filters to be applied to the content where each filter in the set of filters defines a sequence of steps to be applied to the content. The output manager identifies shared steps that are common to the sequence of steps of at least two filters in the set of filters. Thus, upon a first execution of a shared step in a sequence of steps of a first filter, the output manager caches output of the first execution to be used in place of an upcoming execution of that shared step in a sequence of steps in another filter in the set of filters. In this manner, the system applies the set of filters to the content while avoiding redundant execution of the shared steps. This saves filter execution time for filters that have shared steps to be performed on the same content since only the first filter needs to execute the shared step while other filters (e.g. a second filter, a third filter, a fourth filter, etc.) that also include the shared steps on that same content can use the output of the first filter shared step execution as opposed to having to execute that same shared step.

In one embodiment, each filter is a unique content analysis or editing filter that can detect or edit an attribute of a given portion of content, such as a digital video frame. By way of non-limiting example, a filter can determine whether a digital video frame includes music, dialog, a presence of a human face, a level of brightness, a level of contrast, a blur effect, a zoom effect, a pan effect, motion, or a tilt effect. Note that such filters can be used for content classification/detection or for purposes of editing the actual content. As an example, for content detection of classification (e.g. finding all images having a given set of characteristics), once the filter has processed a given portion of content and detects an attribute, the filter associates a tag with the portion of content, where the tag describes the detected attribute. As an example, application of a set of filters can be used to detect and tag all images in a video having the characteristics of each filter in the set of filters. In other cases, the filters can perform actual editing of the content itself (as opposed to detection of content characteristics).

Each filter consists of steps (i.e. procedures, operations, etc.) that must be performed in order for the filter to detect the attribute and associate a tag with the given portion of content or to edit the content itself. Some filters consists of similar steps, or "shared steps". The output manager can detect which filters have steps in common. When a filter with a "shared step" is the first filter to execute that "shared step" on a given portion of content, the output manager caches the output created by the shared step's first execution. When a second filter that also includes the "shared step" later processes that same given portion of content, instead of executing the "shared step" again, the output manager replaces the "shared step" in the second filter with the cached output—thereby increasing the efficiency of executing the second filter as a whole.

It is understood that for steps in various filters to be considered "shared steps", the steps need not be identical. Rather, a first step from a first filter and a second step in a second filter will be considered by the output manager as "shared steps" if the second step can use the output of the first step to optimize the overall execution of the second step in the second filter.

In another embodiment, the first step from the first filter and the second step in the second filter will be considered by the output manager as "shared steps" if output for the second step can be created by modifying output previously generated by the first step—rather than executing the second step. For example, if the first step processed a digital video frame and created output of a gray scale image of that digital video frame having a dimension of 320×240. The output manager considers the first step and second step as "shared steps" if execution of the second filter's second step on the same digital video frame creates output of a gray scale image of that digital video frame having a smaller dimension. Thus, rather than executing the second filter's second step, the output manager retrieves the first step's output (i.e. the gray scale image having the dimension of 320×240) from a cache and modifies the dimension of the gray scale image to conform to the expected result of the second step. The output manager replaces execution of the second step in the second filter with the modified gray scale image and then passes the modified gray scale image to the next step in the second filter.

Referring now to FIG. 1, which is an example block diagram of an output manager 150 caching output from a first execution of a shared step included in a filter of a first subset of filters according to embodiments herein.

The output manager 150 identifies a first subset of filters 200 and second subset of filters 205 from a set of filters to be applied to content 210 (e.g. images, videos, video frames, photos, graphics, design, audio, text, digital data, etc.). Each subset of filters 200, 205 can include any number of filters. As illustrated in FIG. 1, the first, fourth and ninth filters 200-1, 200-4, 200-9 in the first subset 200 each consist of three steps (i.e. procedures, operations), such as steps 200-1-1, 200-1-2, 200-1-3 in the first filter 200-1, steps 200-4-1, 200-4-2, 200-4-3 in the fourth filter 200-4, and steps 200-9-1, 200-9-2, 200-9-3 in the ninth filter 200-9. However, it is understood that a filter can consist of any number of steps.

The output manager 150 identifies a shared step that is common to the sequence of steps in the first, fourth and ninth filters 200-1, 200-4, 200-9, where a shared step is a step within a filter that, instead of having to be fully executed by that filter, can be replaced by cached output previously created from an execution of a similar (or identical) step in another filter. Thus, the output manager 150 identifies the first filter's 200-1 second step 200-1-2, the fourth filter's 200-4 first step 200-4-1 and the ninth filter's 200-9 second step 200-9-2 as shared steps.

The output manager 150 receives multiple portions of content 210-1, 210-2, 210-3 . . . , each of which will be processed by filters in the set of filters (i.e. both subsets of filters 200, 205). The output manager 150 utilizes a parallel partial executor 150-3 to partially execute each filter 200-1 . . . 200-4 . . . 200-9 . . . from the first subset of filters 200 in a parallel fashion. As the filters 200-1 . . . 200-4 . . . 200-9 . . . in the first subset 200 are applied to each of the multiple portions of content 210-1, 210-2, 210-3 . . . , one filter (such as the first filter 200-1) will be the first to perform a "shared step" 200-1-2 on the first portion of content 210-1. In a cache 220, the output manager 150 stores output 230 created during that shared step's 200-1-2 first execution with regard to the first portion of content 210-1. The output manager 150 also caches output 240 created during that shared step's 200-1-2 first execution with regard to a second portion of content 210-2. Further, the output manager 150 also caches output 250 created during that shared step's 200-1-2 first execution with regard to a third portion of content 210-3.

Figure 2:
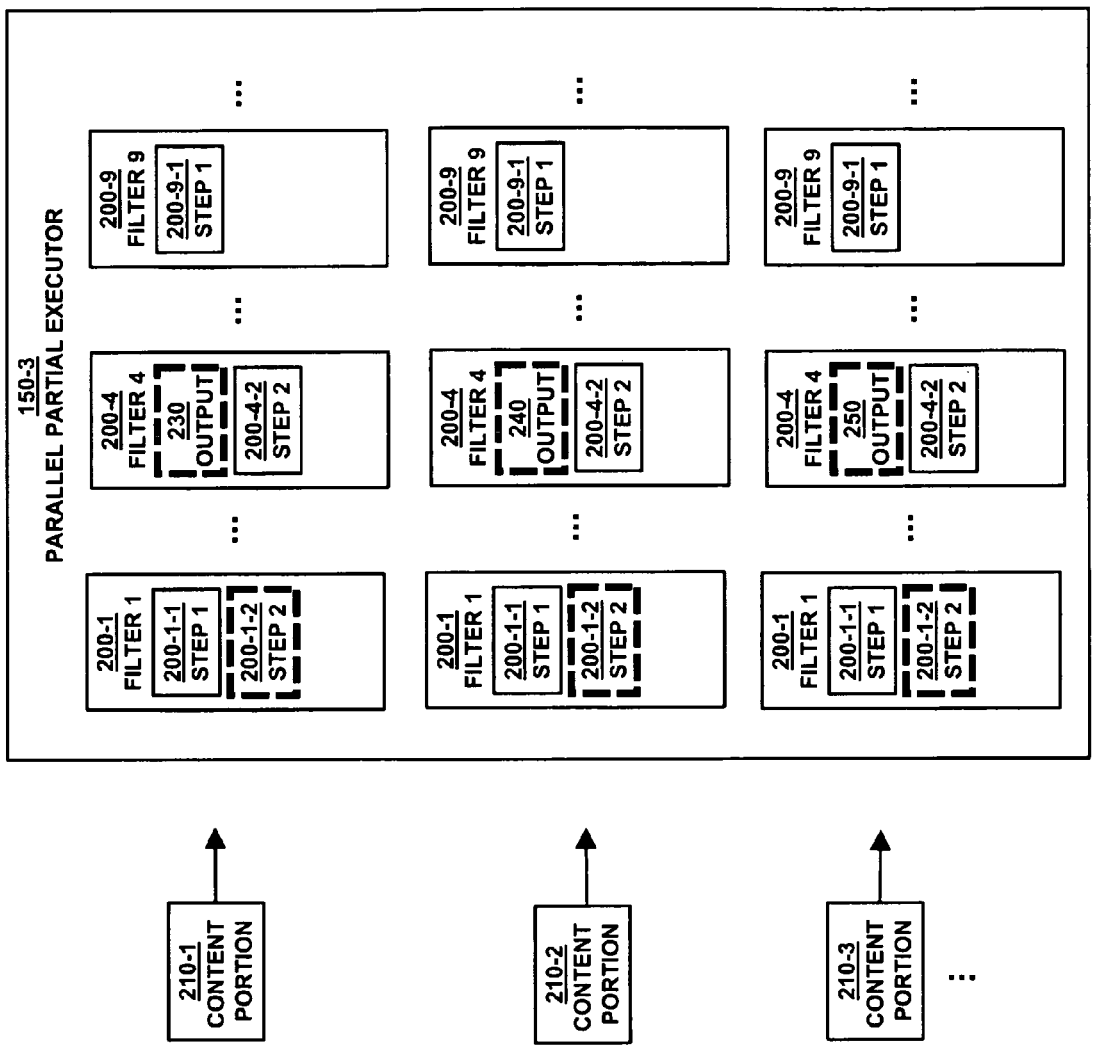
FIG. 2 is an example block diagram of an output manager partially executing each filter from a first subset of filters in a parallel fashion according to embodiments herein.

Turning now to FIG. 2, which provides an example block diagram of an output manager 150 partially executing each filter from a first subset of filters in a parallel fashion according to embodiments herein.

As illustrated in FIG. 2, the output manager's 150 parallel partial executor 150-3 applies each filter 200-1 . . . 200-4 . . . 200-9 . . . in the first subset 200 to the multiple portions of content 210-1, 210-2, 210-3 . . . . During processing of the first portion of content 210-1, instead of executing the fourth filter's 200-4 first step 200-4-1 (which was previously identified as a shared step) the output manager 150 accesses the cache 220 to retrieve the output 230 created from the first filter's 200-1 execution of its second step 200-1-2 (which was also previously identified as a shared step) when the first filter processed the first portion of content 210-1. The output manager 150 replaces having to execute the fourth filter's 200-4 first step 200-4-1 (i.e. the "shared step") with the output 230—thereby increasing the overall efficiency of executing the fourth filter 200-4.

During processing of the second portion of content 210-2, instead of executing the fourth filter's 200-4 first step 200-4-1 (i.e. the "shared step"), the output manager 150 accesses the cache 220 to retrieve the output 240 created from the first filter's 200-1 execution of its second step 200-1-2 (i.e. the "shared step") when the first filter 200-1 executed a first execution of the shared step 200-1-2 on the second portion of content 210-2. The output manager 150 uses the output 240 during application of the fourth filter 200-4 to the second portion of content 210-1 in place of having to execute the fourth filter's 200-4 first step 200-4-1 (i.e. the "shared step").

Similarly, during processing of the third portion of content 210-3, the output manager 150 accesses the cache 220 to retrieve the output 250 created from the first filter's 200-1 execution of its second step 200-1-2 (i.e. the "shared step") when the first filter 200-1 was applied to the third portion of content 210-3. The output manager 150 utilizes the output 250 in place of having to execute the fourth filter's 200-4 first step 200-4-1 (i.e. the "shared step") when the fourth filter 200-4 processes the third portion of content 210-3.

As all the filters 200-1 . . . 200-4 . . . 200-9 . . . in the first subset 200 are partially executed in parallel, the filters execute at different rates since some steps in some filters may take longer to complete than others. As illustrated in FIG. 2, the ninth filter 200-9 only completes its first 200-9-1 and never commences execution of its second step 200-9-2—which was previously identified as a shared step as well. When partial execution of all the filters 200-1 . . . 200-4 . . . 200-9 . . . in the first subset 200 is complete, the output manager 150 deletes all the cached output 230, 240, 250 from the cache 220. Thus, when the output manager 150 begins a partial execution of all the filters in the second subset of filters 205, there will be available storage space in the cache 220.

Figure 3:
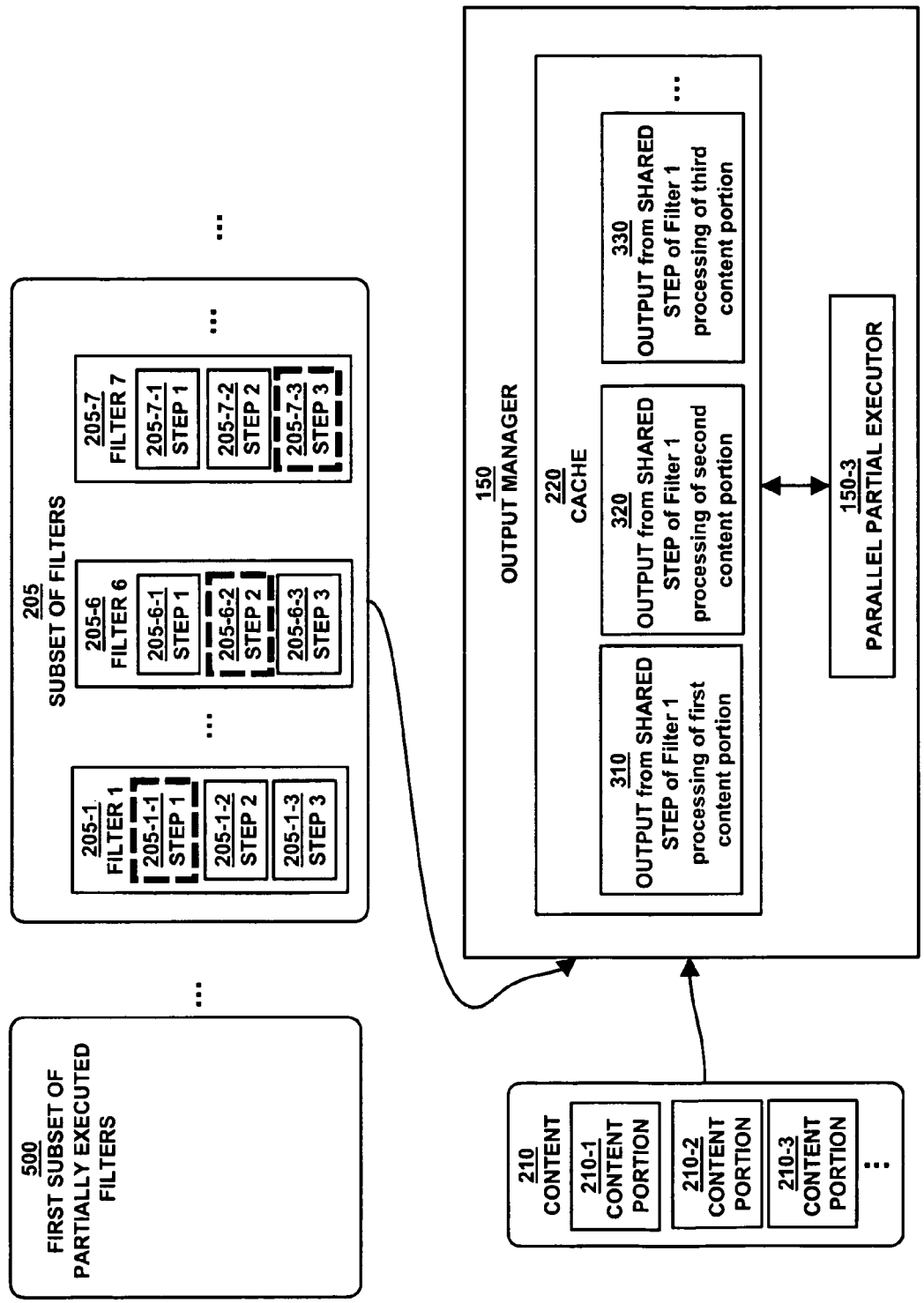
FIG. 3 is an example block diagram of an output manager caching output from a first execution of a shared step included in a filter of a second subset of filters according to embodiments herein.

FIG. 3 is an example block diagram of an output manager 150 caching output from a first execution of a shared step included in a filter of a second subset of filters according to embodiments herein.

In the second subset of filters 205, the output manager 150 identifies a shared step that is common to the sequence of steps in the first, sixth and seventh filters 205-1, 205-6, 205-7. Specifically, the output manager 150 identifies the first filter's 205-1 first step 205-1-1, the sixth filter's 205-6 second step 205-6-2 and the seventh filter's 200-7 third step 200-7-3 as shared steps.

The output manager 150 utilizes the parallel partial executor 150-3 to partially execute each filter 205-1 . . . 205-6, 205-7 . . . from the second subset of filters 205 in a parallel fashion. As the filters 205-1 . . . 205-6, 205-7 . . . in the second subset 205 are applied to each of the multiple portions of content 210-1, 210-2, 210-3 . . . , one filter (such as the first filter 205-1) will be the first to perform a "shared step" 205-1-1 on the first portion of content 210-1. In the cache 220, which no longer stores output 230, 240, 250 from partial execution of the first subset of filters 200, the output manager 150 stores output 310 created during that shared step's 205-1-1 first execution with regard to the first portion of content 210-1. The output manager 150 also caches output 320 created during that shared step's 205-1-1 first execution with regard to a second portion of content 210-2. Further, the output manager 150 also caches output 330 created during that shared step's 205-1-1 first execution with regard to a third portion of content 210-3.

Figure 4:
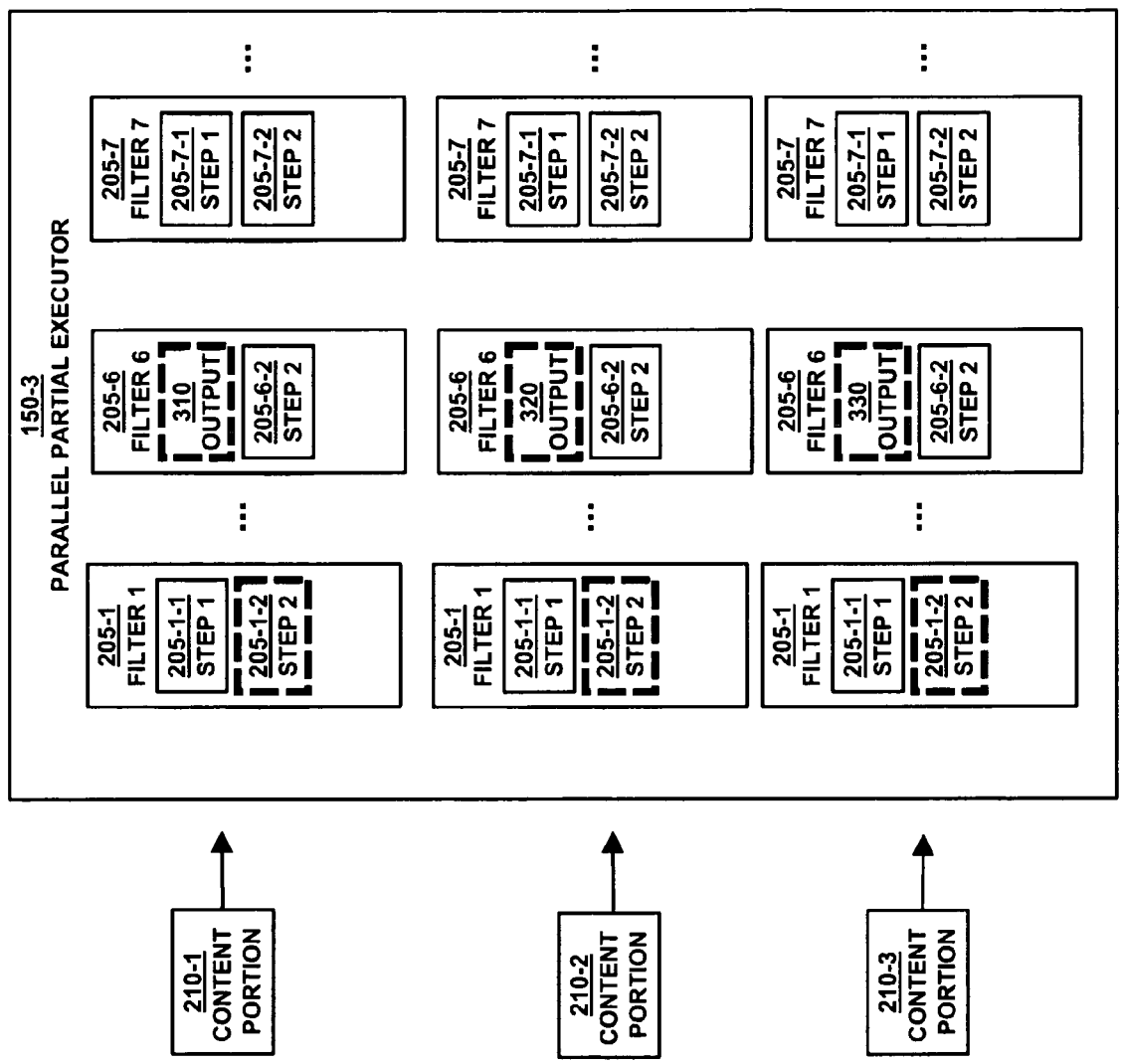
FIG. 4 is an example block diagram of an output manager partially executing each filter from a second subset of filters in a parallel fashion according to embodiments herein.

FIG. 4 is an example block diagram of an output manager 150 partially executing each filter from a second subset of filters in a parallel fashion according to embodiments herein.

As illustrated in FIG. 4, the output manager's 150 parallel partial executor 150-3 applies each filter 205-1 . . . 205-6, 205-7 . . . in the second subset 205 to the multiple portions of content 210-1, 210-2, 210-3 . . . . During processing of the first portion of content 210-1, instead of executing the sixth filter's 200-6 second step 205-6-2 (i.e. the "shared step") the output manager 150 accesses the cache 220 to retrieve the output 310 created from the first filter's 205-1 execution of its first step 205-1-1 (which was also identified as a shared step) when the first filter 205-1 processed the first portion of content 210-1. The output manager 150 replaces having to execute the sixth filter's 200-6 second step 205-6-2 (i.e. the "shared step") with the output 310.

During processing of the second portion of content 210-2, instead of executing the sixth filter's 200-6 second step 205-6-2 (i.e. the "shared step"), the output manager 150 accesses the cache 220 to retrieve the output 320 created from the first filter's 205-1 execution of its first step 205-1-1 (i.e. the "shared step") when the first filter 205-1 executed a first execution of the shared step 205-1-1 on the second portion of content 210-2. The output manager 150 uses the output 320 during application of the sixth filter 200-6 to the second portion of content 210-1 in place of having to execute the sixth filter's 200-6 second step 205-6-2 (i.e. the "shared step").

Similarly, during processing of the third portion of content 210-3, the output manager 150 accesses the cache 220 to retrieve the output 330 created from the first filter's 205-1 execution of its first step 205-1-1 (i.e. the "shared step") when the first filter 205-1 was applied to the third portion of content 210-3. The output manager 150 utilizes the output 330 in place of having to execute the sixth filter's 200-6 second step 205-6-2 (i.e. the "shared step") when the sixth filter 200-6 processes the third portion of content 210-3.

Figure 5:
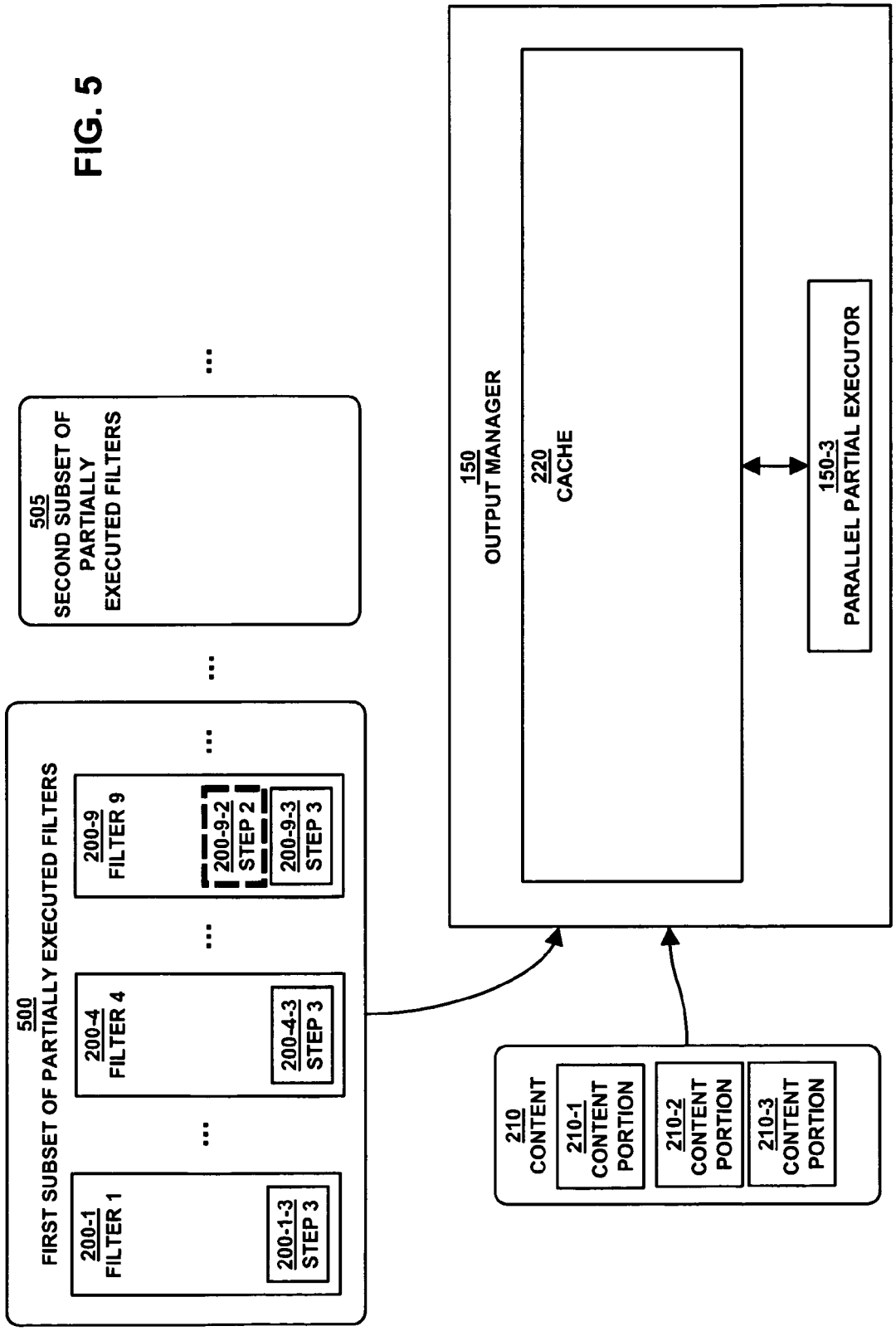
FIG. 5 is an example block diagram of an output manager deleting output created during a partial execution of each filter in a second subset of filters according to embodiments herein.

FIG. 5 is an example block diagram of an output manager 150 deleting output created during a partial execution of each filter in a second subset of filters according to embodiments herein.

When partial execution of all the filters 205-1 . . . 205-6, 205-7 . . . in the second subset 205 is complete, the second subset 205 becomes a second subset of partially executed filters 505—where the first filter 205-1, sixth filter 205-6 and seventh filter 205-7 each have yet to execute their third steps 205-1-3, 205-6-3, 205-7-3, respectively. In addition, the output manager 150 deletes all the cached output 310, 320, 330 from the cache 220. Thus, when the output manager 150 returns to resume execution of all the filters in the first subset of filters 200, there will be available storage space in the cache 220. The output manager 150 returns to filters 200-1 . . . 200-4 . . . 200-9 . . . in the first subset 200, which is currently a first subset of partially executed filters 500 in order to resume execution the partially executed filters 200-1 . . . 200-4 . . . 200-9 . . . .

Figure 6:
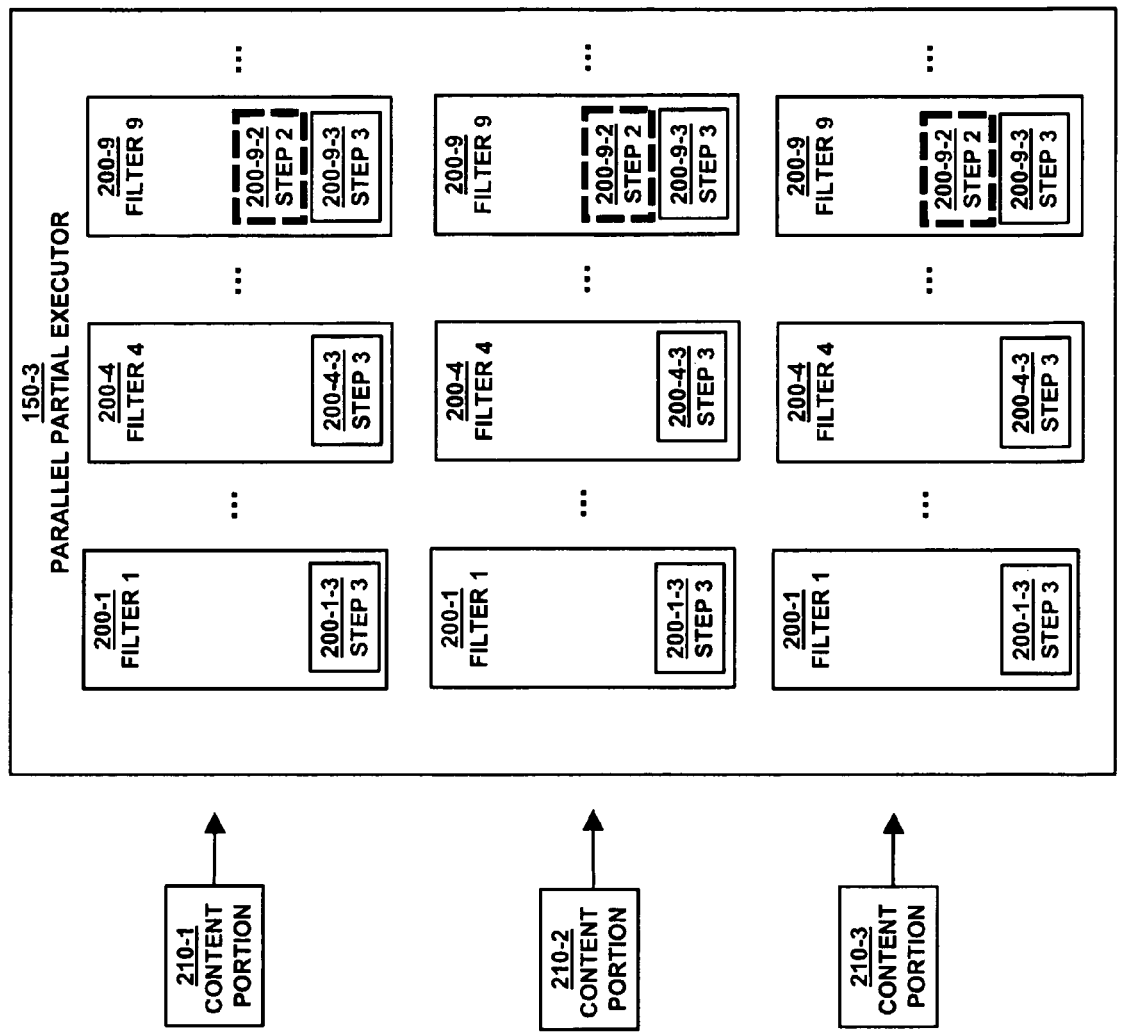
FIG. 6 is an example block diagram of an output manager resuming execution each filter from a first subset of filters in a parallel fashion according to embodiments herein.

FIG. 6 is an example block diagram of an output manager 150 resuming execution each filter from a first subset of filters (i.e. the first subset of partially executed filters 500) in a parallel fashion according to embodiments herein.

As the output manager 150 resumes execution of the first filter 200-1 and the fourth filter 200-4 on the multiple portions of content 210-1, 210-2, 210-3 . . . in a parallel fashion, the output manager 150 executes the third step 200-1-3, 200-4-3 for the first filter 200-1 and the fourth filter 200-4, respectively. As the output manager 150 resumes execution of the ninth filter 200-9, the ninth filter 200-9 has two more steps 200-9-2, 200-9-3 to be executed.

The ninth filter's 200-9 second step 200-9-2 was previously identified by the output manager 150 as a "shared step." Thus, the ninth filter 200-9 will be the first filter to execute the "shared step" since execution of the filters in the subset of partially executed filters 500 was resumed. Moreover, the output manager 150 cannot replace execution of the ninth filter's 200-9 second step 200-9-2 (i.e. the "shared step") with output 230, 240, 250 from a previous execution of the shared step in another filter because the output manager 150 has already deleted output 230, 240, 250 from the cache 220. Hence, the output manager's 150 execution of the ninth filter 200-9 includes a complete execution of the ninth filter's 200-9 second step 200-9-2 (i.e. the "shared step").

As the output manager 150 executes the ninth filter's 200-9 second step 200-9-2 (i.e. the "shared step"), the output manager 150 can save the output created by executing the second step 200-9-2. If there are other filters in the first subset of partially executed filters 500 that also consist of the "shared step", the output manager 150 caches the output created by executing the ninth filter's 200-9 second step 200-9-2 (i.e. the "shared step"). However, if the output manager 150 detects that the ninth filter 200-9 is the last filter in the first subset of partially executed filters 500 that has yet to execute the "shared step", the output manager 150 does not have to cache the output created by executing the ninth filter's 200-9 second step 200-9-2 (i.e. the "shared step").

The output manager 150 can continue applying all the filters 200-1 . . . 200-4 . . . 200-9 . . . in the first subset of partially executed filters 500 to the multiple portions of content 210-1, 210-2, 210-3 . . . in a parallel fashion until all the filters 200-1 . . . 200-4 . . . 200-9 . . . have been completely executed. In the alternative, the output manager 150 can again perform yet another partial execution of the partially executed filters 200-1 . . . 200-4 . . . 200-9 . . . —resuming the execution of each filter from a step not yet performed.

Figure 7:
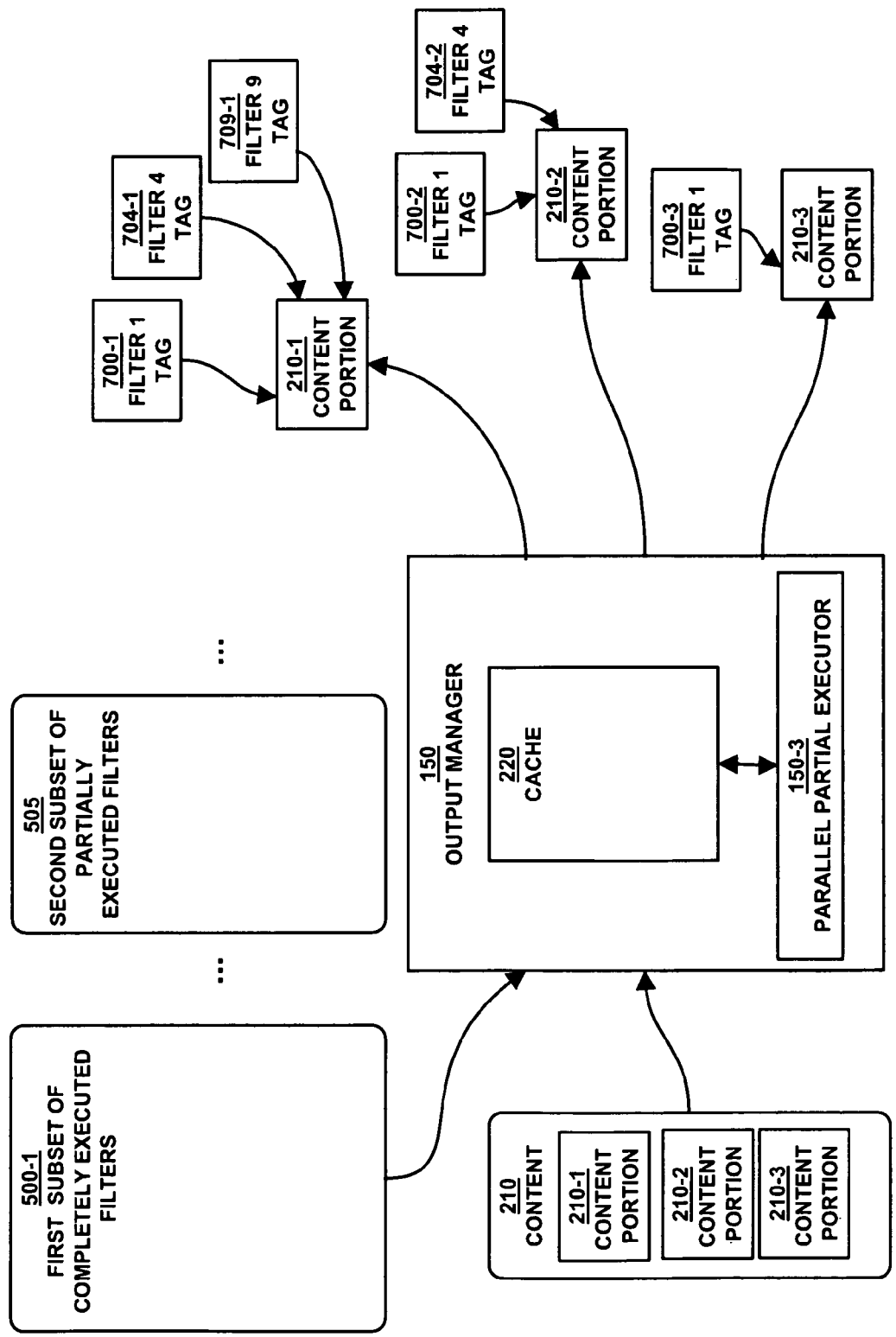
FIG. 7 is an example block diagram of an output manager tagging portions of content as the output manager completes execution of each filter in a first subset of filters according to embodiments herein.

FIG. 7 is an example block diagram of an output manager 150 tagging portions of content as the output manager completes execution of each filter in a first subset of filters according to embodiments herein.

As the output manager 150 completes execution of each filter 200-1 . . . 200-4 . . . 200-9 . . . , each filter 200-1 . . . 200-4 . . . 200-9 . . . determines if a particular attribute is present in portions of content processed by the filter. For example, the first filter 200-1 performs steps 200-1-1, 200-1-2, 200-1-3 to determine if a blur effect is present in a given portion of content 210-1, 210-2, 210-3 . . . . Upon executing the first filter 200-1, the output manager 150 determines that the first portion of content 210-1, the second portion of content 210-2 and the third portion of content 210-3 each present a blur effect, the output manager 150 associates tags 700-1, 700-2, 700-3 with those portions of content 210-1, 210-2, 210-3 . . . —where the tags 700-1, 700-2, 700-3 are metadata that describe presence of the blur effect.

Upon executing the fourth filter 200-4, the output manager 150 determines that the first portion of content 210-1 and the second portion of content 210-2 each present a zoom effect, the output manager 150 associates tags 704-1, 704-2 with those portions of content 210-1, 210-2—where the tags 704-1, 704-2 are metadata that describe presence of the zoom effect. Similarly, upon executing the ninth filter 200-9, the output manager 150 determines that the first portion of content 210-1 includes music. The output manager 150 associates a tag 709-1 with the portion of content 210-1 that describes presence of the music.

Figure 8:
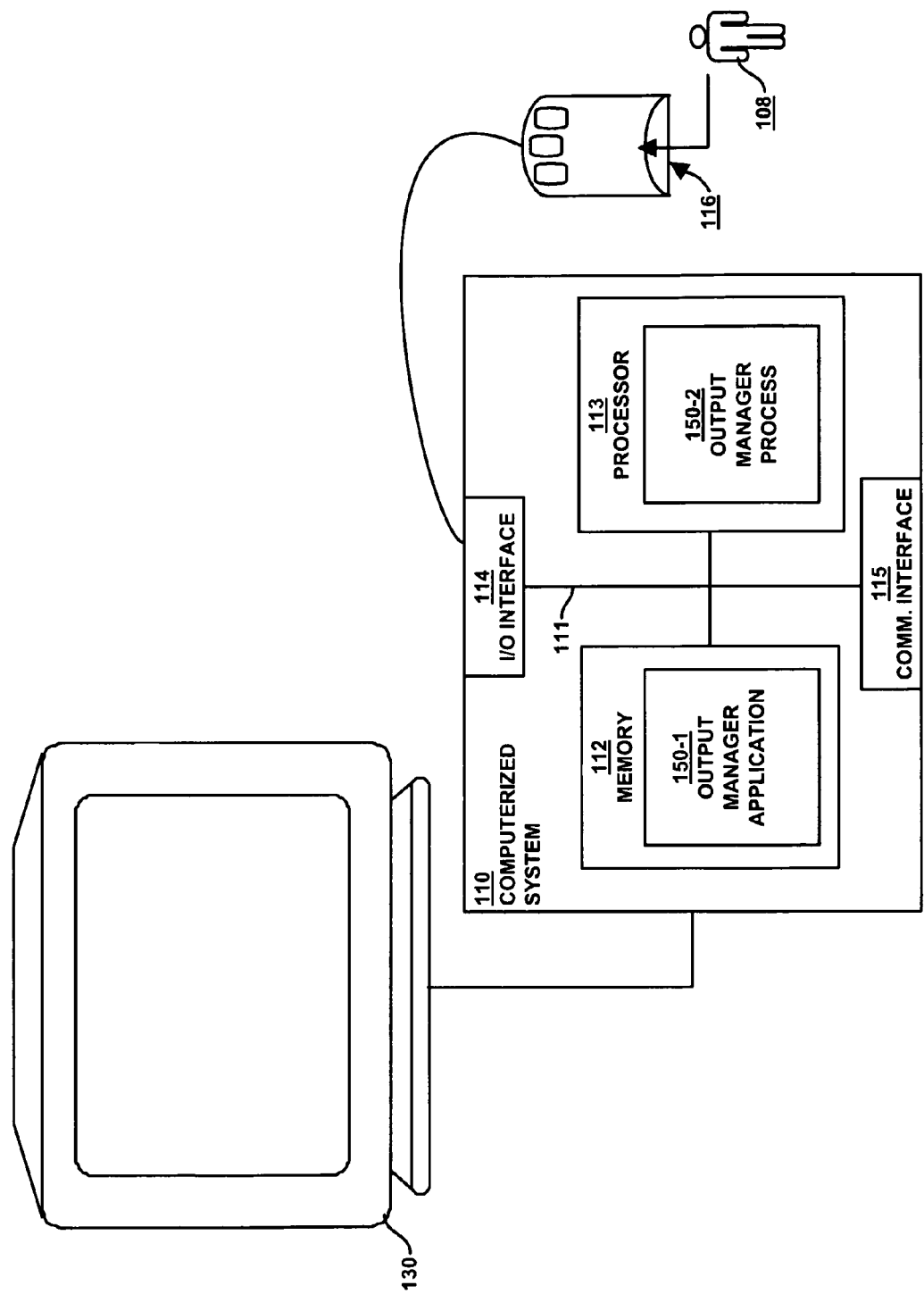
FIG. 8 is an example block diagram illustrating an architecture of a computer system that executes an output manager application and/or an output manager process according to embodiments herein.

FIG. 8 is an example block diagram illustrating an architecture of a computer system 110 that executes, runs, interprets, operates or otherwise performs a output manager application 150-1 and/or output manager process 150-2 (e.g. an executing version of a output manager 150 as controlled or configured by user 108) according to embodiments herein.

Note that the computer system 110 may be any type of computerized device such as a personal computer, a client computer system, workstation, portable computing device, console, laptop, network terminal, etc. This list is not exhaustive and is provided as an example of different possible embodiments.

In addition to a single computer embodiment, computer system 110 can include any number of computer systems in a network environment to carry the embodiments as described herein.

As shown in the present example, the computer system 110 includes an interconnection mechanism 111 such as a data bus, motherboard or other circuitry that couples a memory system 112, a processor 113, an input/output interface 114, and a display 130. If so configured, the display can be used to present a graphical user interface of the output manager 150 to user 108. An input device 116 (e.g., one or more user/developer controlled devices such as a keyboard, mouse, touch pad, etc.) couples to the computer system 110 and processor 113 through an input/output (I/O) interface 114. The computer system 110 can be a client system and/or a server system. As mentioned above, depending on the embodiment, the output manager application 150-1 and/or the output manager process 150-2 can be distributed and executed in multiple nodes in a computer network environment or performed locally on a single computer.

During operation of the computer system 110, the processor 113 accesses the memory system 112 via the interconnect 111 in order to launch, run, execute, interpret or otherwise perform the logic instructions of the output manager application 150-1. Execution of the output manager application 150-1 in this manner produces the output manager process 150-2. In other words, the output manager process 150-2 represents one or more portions or runtime instances of the output manager application 150-1 (or the entire application 150-1) performing or executing within or upon the processor 113 in the computerized device 110 at runtime.

The output manager application 150-1 may be stored on a computer readable medium (such as a floppy disk), hard disk, electronic, magnetic, optical, or other computer readable medium. It is understood that embodiments and techniques discussed herein are well suited for other applications as well.

Those skilled in the art will understand that the computer system 110 may include other processes and/or software and hardware components, such as an operating system. Display 130 need not be coupled directly to computer system 110. For example, the output manager application 150-1 can be executed on a remotely accessible computerized device via the communication interface 115.

Figure 9:
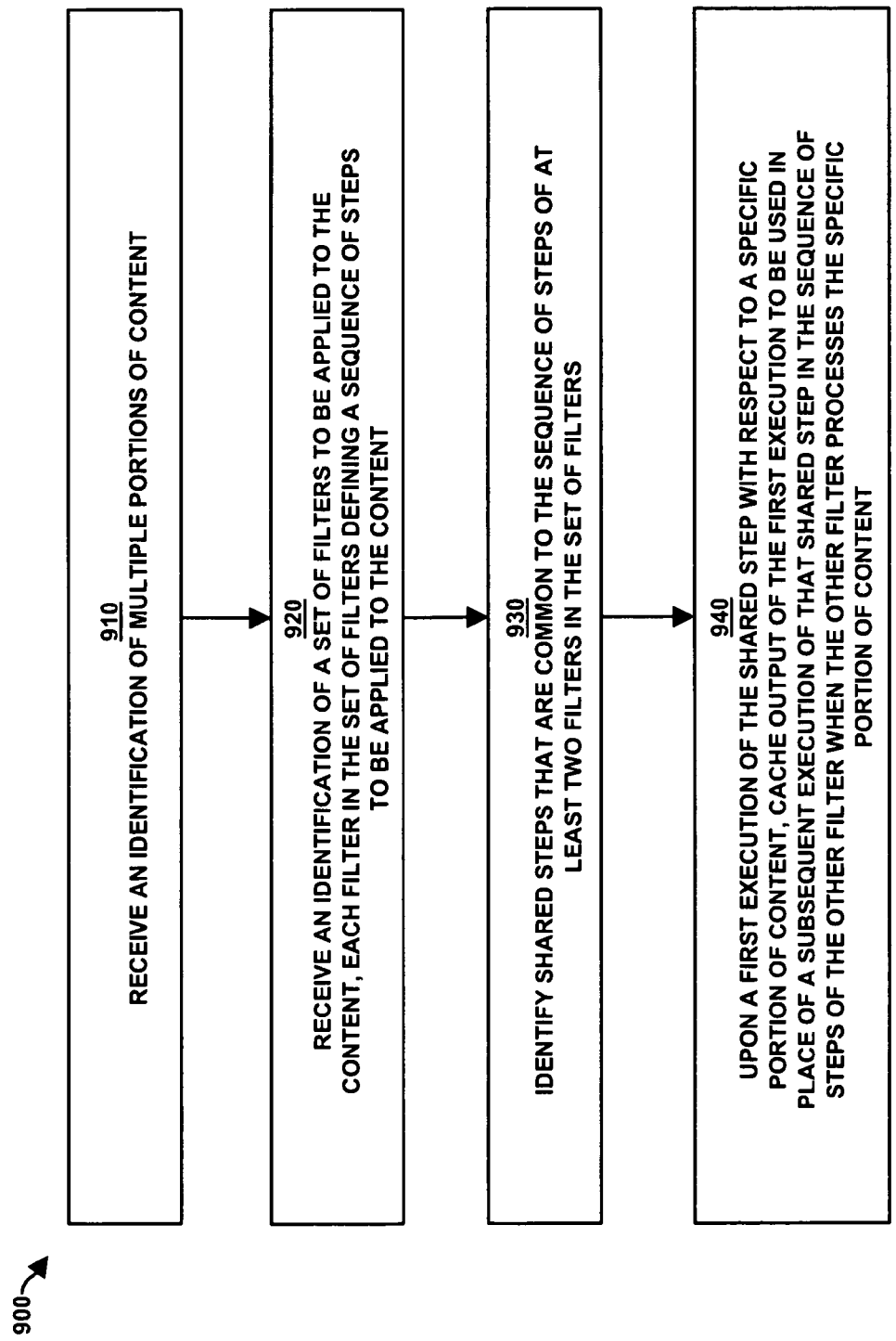
FIG. 9 is a flowchart of an example of processing steps performed by the output manager to cache output of a first execution of a share step with respect to a specific portion of content according to embodiments herein.
Figure 10:
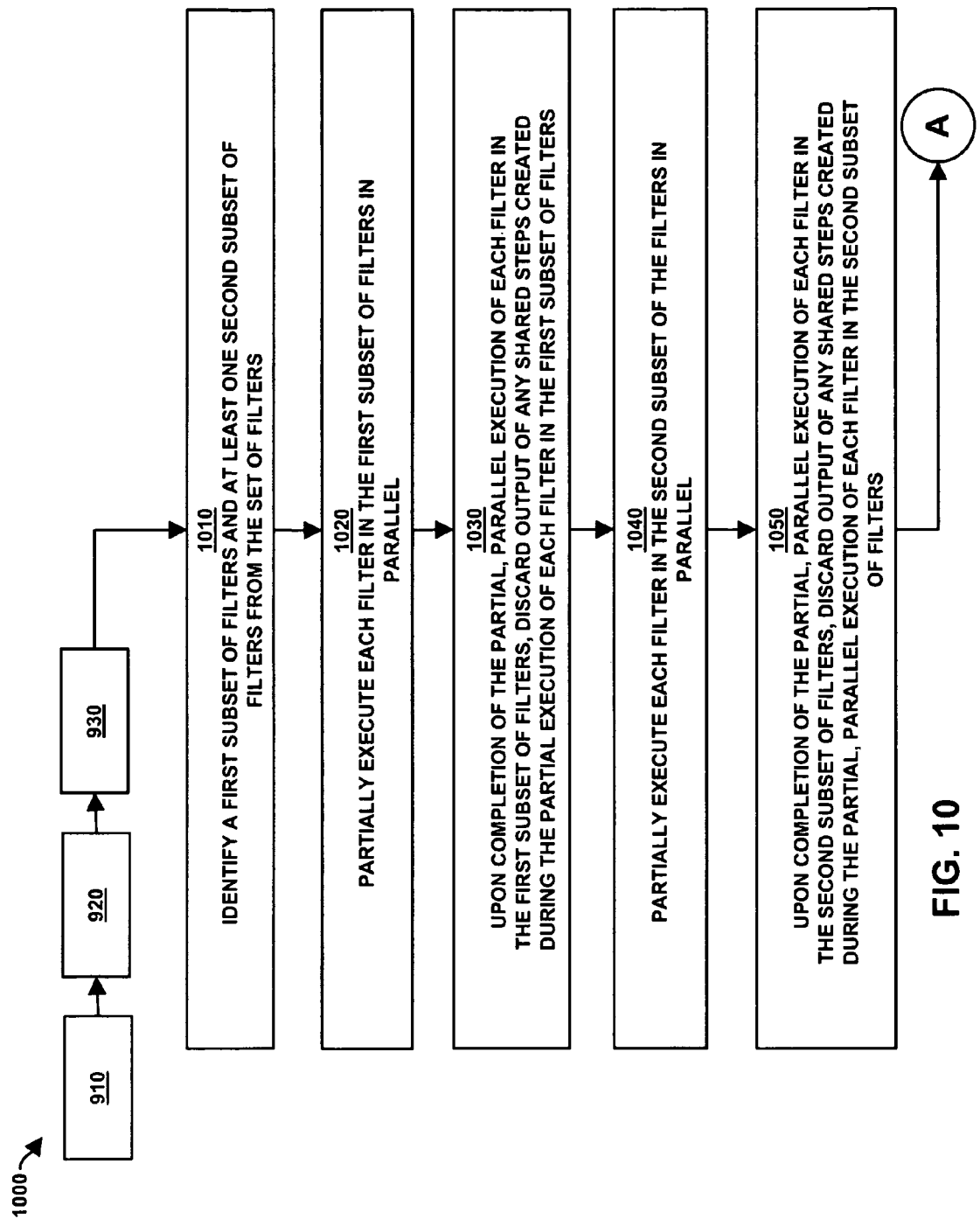
FIG. 10 and FIG. 11 are flowcharts of an example of processing steps performed by the output manager to alternate between subsets of filters to partially execute filters in each subset according to embodiments herein.
Figure 11:
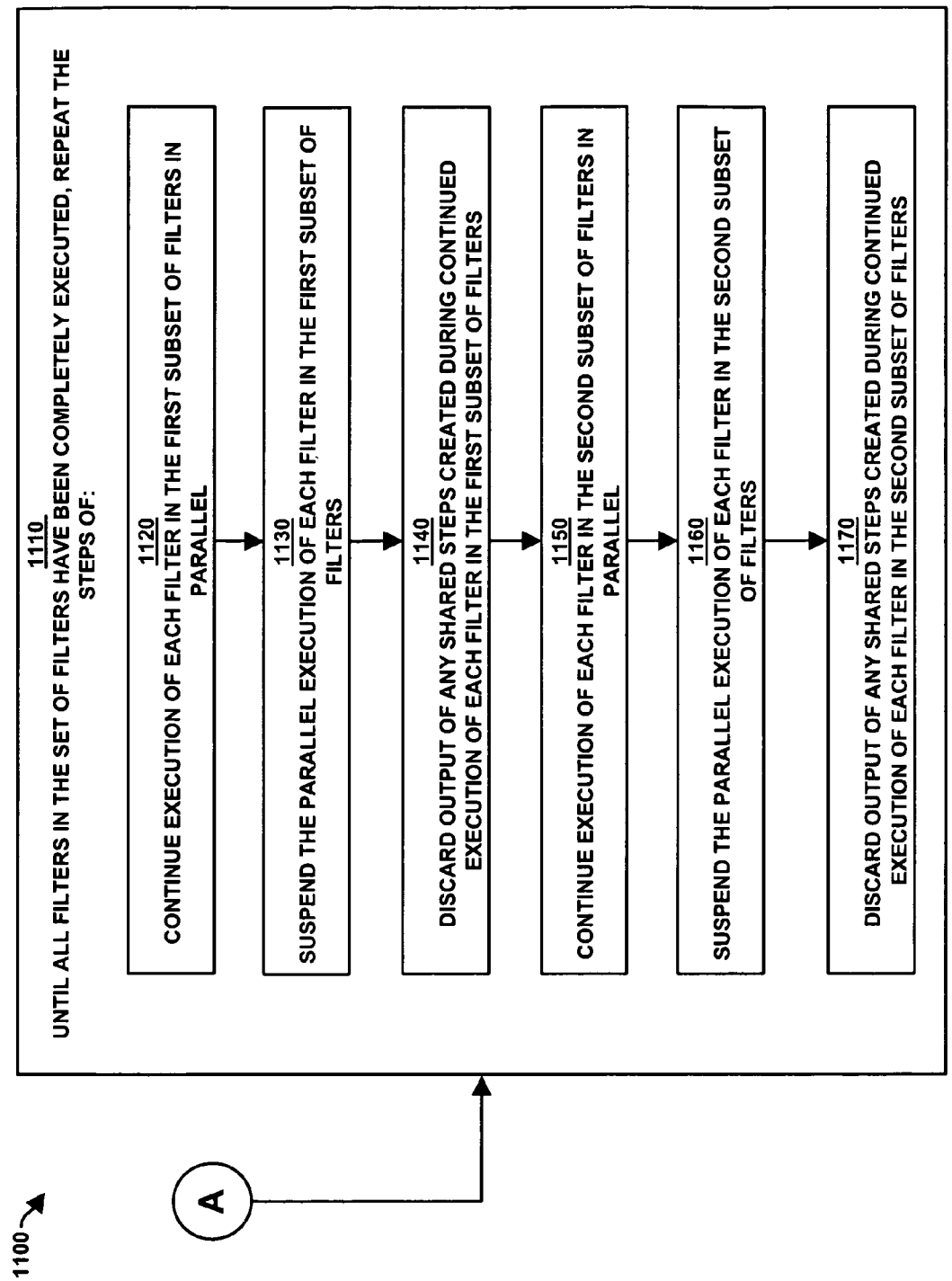

FIG. 9 through FIG. 11 illustrate various embodiment of the output manager 150. The rectangular elements in flowcharts denote "processing blocks" and represent computer software instructions or groups of instructions upon a computer readable medium. Additionally, the processing blocks represent steps performed by hardware such as a computer, digital signal processor circuit, application specific integrated circuit (ASIC), etc.

Flowcharts 900, 1000, 1100 do not necessarily depict the syntax of any particular programming language. Rather, flowcharts 900, 1000, 1100 illustrate the functional information one of ordinary skill in the art requires to fabricate circuits or to generate computer software to perform the processing required in accordance with the present invention.

It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

FIG. 9 is a flowchart 900 of an example of processing steps performed by the output manager 150 to cache output of a first execution of a share step with respect to a specific portion of content according to embodiments herein.

At step 910, the output manager 150 receives an identification of multiple portions of content. As discussed above, the content may be any type of digital content such as digital images, video frames and so forth.

At step 920, the output manager 150 receives an identification of a set of filters to be applied to the content, each filter in the set of filters defining a sequence of steps to be applied to the content.

At step 930, the output manager 150 identifies shared steps (i.e. at least one shared step) that are common to the sequence of steps of at least two filters in the set of filters.

At step 940, upon the first execution of the shared step with respect to a specific portion of content, the output manager 150 caches output of the first execution so that the cached output can be used in place of a subsequent execution of that shared step in the sequence of steps of another filter when that other filter processes the specific portion of content. In this manner, the system applies the set of filters to the content while avoiding redundant execution of the shared steps.

FIG. 10 is a flowchart 1000 of an example of processing steps performed by the output manager 150 to alternate between subsets of filters to partially execute filters in each subset according to embodiments herein.

At step 1010, the output manager 150 identifies a first subset of filters and at least one second subset of filters from the set of filters.

At step 1020, the output manager 150 partially executes each filter in the first subset of filters in parallel. With respect to any specific portion of content, upon a first execution of any shared step in the first subset of filters, the output manager 150 caches output of that first execution. The output manager 150 uses the cached output in place of a subsequent execution of that shared step when it occurs in a sequence of steps of another filter(s) in the first subset of filters when any of those other filters processes that same specific portion of content. Further, upon detecting that all of the other filters in the first subset of filters with a sequence of steps that include the shared step have already executed the shared step, the output manager 150 deletes the output of the first execution of the shared step.

At step 1030, upon completion of the partial, parallel execution of each filter in the first subset of filters, the output manager 150 discards output of any shared steps created during the partial execution of each filter in the first subset of filters.

At step 1040, the output manager 150 partially executes each filter in the second subset of the filters in parallel. With respect to any specific portion of content, upon a first execution of any shared step in the second subset of filters, the output manager 150 caches output of that first execution. The output manager 150 uses the cached output in place of a subsequent execution of that shared step when it occurs in a sequence of steps of another filter(s) in the second subset of filters when any of those other filters processes that same specific portion of content. Further, upon detecting that all of the other filters in the second subset of filters with a sequence of steps that include the shared step have already executed the shared step, the output manager 150 deletes the output of the first execution of the shared step.

At step 1050, upon completion of the partial, parallel execution of each filter in the second subset of filters, the output manager 150 discards output of any shared steps created during the partial, parallel execution of each filter in the first subset of filters.

FIG. 11 is a flowchart 1100 of an example of processing steps performed by the output manager 150 to continue alternating between subsets of filters to partially execute filters in each subset according to embodiments herein.

At step 1110, until all filters in the set of filters have been completely executed, the output manager 150 repeats the steps of:

At step 1120, the output manager 150 continues execution of each filter in the first subset of filters in parallel.

At step 1130, the output manager 150 suspends the parallel execution of each filter in the first subset of filters.

At step 1140, the output manager 150 discards output of any shared steps created during continued execution of each filter in the first subset of filters.

At step 1150, the output manager 150 continue execution of each filter in the second subset of filters in parallel.

At step 1160, the output manager 150 suspends the parallel execution of each filter in the second subset of filters.

At step 1170, the output manager 150 discards output of any shared steps created during continued execution of each filter in the second subset of filters.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a processor", or "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application.

References to a network, unless provided otherwise, may include one or more intranets and/or the internet, as well as a virtual network. References herein to microprocessor instructions or microprocessor-executable instructions, in accordance with the above, may be understood to include programmable hardware.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A computer-implemented method comprising:
receiving, by a processor, an identification of a set of filters to be applied to content, each filter in the set of filters comprising a sequence of steps;
identifying, by the processor, at least one shared step common to the sequence of steps of a first filter and at least one second filter in the set of filters, wherein the first filter and the at least one second filter are configured to receive identical inputs and to generate different outputs; and
applying, by the processor, the set of filters to the content by replacing a second execution of the at least one shared step by the at least one second filter using an output of a first execution of the at least one shared step by the first filter, wherein the second execution is replaced based on the first execution being performed.

2. The computer-implemented method of claim 1, comprising:
based on the first execution of the at least one shared step by the first filter, caching the output of the first execution to be used in place of the second execution of the at least one shared by the at least one second filter in the set of filters.

3. The computer-implemented method of claim 2, comprising:
receiving an identification of multiple portions of content; and
wherein the output of the first execution is cached based on the first execution of the at least one shared step with respect to a specific portion of content.

4. The computer-implemented method of claim 3, comprising:
based on detecting that all filters having a sequence of steps that include the at least one shared step have used the cached output in processing the specific portion of content, deleting the output of the first execution of the at least one shared step.

5. The computer-implemented method of claim 1, wherein identifying the at least one shared step includes:
identifying a shared step between the first filter and the at least one second filter, the first filter defined to describe an occurrence of a first attribute in a given portion of image content, the at least one second filter defined to describe an occurrence of a second attribute of the given portion of image content.

6. The computer-implemented method of claim 1, wherein identifying the at least one shared step includes:
identifying a particular step in the sequence of steps of the at least one second filter that can be replaced by modifying output from a step in the sequence of steps of the first filter; and
identifying the particular step and the step in the sequence of steps of the first filter as shared steps.

7. The computer-implemented method of claim 1, wherein identifying the at least one shared step includes:
identifying a particular step in the sequence of steps of the at least one second filter that can be optimized by processing output of a step in the sequence of steps of the first filter during execution of the particular step in the sequence of steps of the at least one second filter; and
identifying the particular step and the step in the sequence of steps of the first filter as shared steps.

8. The computer-implemented method of claim 1, further comprising:
receiving an identification of multiple portions of content;
identifying a first subset of filters and at least one second subset of filters from the set of filters;
partially executing each filter in the first subset of filters in parallel;
based on completion of the partial execution of each filter in the first subset of filters, discarding output of any shared steps created during the partial execution of each filter in the first subset of filters;
partially executing each filter in the second subset of filters in parallel; and
based on completion of the partial parallel execution of each filter in the second subset of filters, discarding output of any shared steps created during the partial parallel execution of each filter in the second subset of filters.

9. The computer-implemented method of claim 8,
wherein partially executing each filter in the first subset of filters in parallel includes:
with respect to a first specific portion of content, based on executing the at least one shared step in the first subset of filters, caching output from executing the at least one shared step in the first subset of filters, and
replacing a subsequent execution of the at least one shared step in the sequence of steps of other filters in the first subset of filters based on at least one of the other filters in the first subset of filters processing the first specific portion of content; and
wherein partially executing each filter in the second subset of filters in parallel includes:
with respect to a second specific portion of content, based on executing the at least one shared step in the second subset of filters, caching output from executing the at least one shared step in the second subset of filters, and
replacing a subsequent execution of the at least one shared step in the sequence of steps of other filters in the second subset of filters based on at least one of the other filters in the second subset of filters processing the second specific portion of content.

10. The computer-implemented method as in claim 9, comprising:
wherein partially executing each filter in the first subset of filters in parallel includes:
based on detecting that all filters in the first subset of filters with a sequence of steps that include the at least one shared step have executed the at least one shared step, deleting the output from executing the at least one shared step in the first subset of filters; and
wherein partially executing each filter in the second subset of filters in parallel includes:
based on detecting that all filters in the second subset of filters with a sequence of steps that include the at least one shared step have executed the at least one shared step, deleting the output from executing the at least one shared step in the second subset of filters.

11. The computer-implemented method as in claim 8, further comprising:
until all filters in the set of filters have been completely executed, repeating the steps of:
continuing execution of each filter in the first subset of filters in parallel;
suspending the parallel execution of each filter in the first subset of filters;

discarding output of any shared steps created during continued execution of each filter in the first subset of filters;

continuing execution of each filter in the second subset of filters in parallel;

suspending the parallel execution of each filter in the second subset of filters; and discarding output of any shared steps created during continued execution of each filter in the second subset of filters.

12. The computer-implemented method of claim 1, comprising:

based on the first execution of a shared step in a sequence of steps of a first filter, caching output of the first execution to be used in place of an upcoming execution of the at least one shared step in a sequence of steps of a second filter and a third filter in the set of filters.

13. A computer program product including a non-transitory computer-readable medium having instructions stored thereon for processing data information, such that the instructions, when carried out by a processing device, enable the processing device to perform operations for:

receiving an identification of a set of filters to be applied to content, each filter in the set of filters comprising a sequence of steps;

identifying at least one shared step common to the sequence of steps of a first filter and at least one second filter in the set of filters, wherein the first filter and the at least one second filter are configured to receive identical inputs and to generate different outputs; and applying the set of filters to the content by replacing a second execution of the at least one shared step by the at least one second filter using an output of a first execution of the at least one shared step by the first filter, wherein the second execution is replaced based on the first execution being performed.

14. The computer program product of claim 13, further comprising instructions enabling the processing device to perform additional operations of:

based on the first execution of the at least one shared step by the first filter, operations for caching the output of the first execution to be used in place of the second execution of the at least one shared by the at least one second filter in the set of filters.

15. The computer program product of claim 14, wherein the operations for receiving an identification of content include operations for receiving multiple portions of content; and wherein the output of the first execution is cached based on the first execution of the at least one shared step with respect to a specific portion of content.

16. The computer program product of claim 15, further comprising instructions enabling the processing device to perform additional operations of:

based on detecting that all filters having a sequence of steps that include the at least one shared step have used the cached output in processing the specific portion of content, operations for deleting the output of the first execution of the at least one shared step.

17. The computer program product of claim 13, wherein the operations for identifying the at least one shared step include operations for:

identifying a shared step between the first filter and the at least one second filter, the first filter defined to describe an occurrence of a first attribute in a given portion of image content, the at least one second filter defined to describe an occurrence of a second attribute of the given portion of image content.

18. The computer program product of claim 13, wherein the operations for identifying the at least one shared step in the set of filters include operations for:

identifying a particular step in the sequence of steps of the at least one second filter that can be replaced by modifying output from a step in the sequence of steps of the first filter; and identifying the particular step and the step in the sequence of steps of the first filter as shared steps.

19. The computer program product of claim 13, wherein the operations for identifying the at least one shared step includes operations for:

identifying a particular step in the sequence of steps of the at least one second filter that can be optimized by processing output of a step in the sequence of steps of the first filter during execution of the particular step in the sequence of steps of the at least one second filter; and identifying the particular step and the step in the sequence of steps of the first filter as shared steps.

20. The computer program product of claim 13, comprising:

operations for receiving an identification of multiple portions of content;

operations for identifying a first subset of filters and at least one second subset of filters from the set of filters;

operations for partially executing each filter in the first subset of filters in parallel;

operations for, based on completion of the partial execution of each filter in the first subset of filters, discarding output of any shared steps created during the partial execution of each filter in the first subset of filters;

operations for partially executing each filter in the second subset of the filters in parallel; and operations for, based on completion of the partial operations for parallel execution of each filter in the second subset of filters, discarding output of any shared steps created during the partial parallel execution of each filter in the second subset of filters.

21. The computer program product of claim 20, comprising:

wherein the operations for partially executing each filter in the first subset of filters in parallel include operations for:

with respect to a first specific portion of content, based on executing the at least one shared step in the first subset of filters, caching output from executing the at least one shared step in the first subset of filters, and replacing a subsequent execution of the at least one shared step in the sequence of steps of other filters in the first subset of filters based on at least one of the other filters in the first subset of filters processing the first specific portion of content; and wherein the operations for partially executing each filter in the second subset of filters in parallel include operations for:

with respect to a second specific portion of content, based on executing the at least one shared step in the second subset of filters, caching output from executing the at least one shared step in the second subset of filters, and replacing a subsequent execution of the at least one shared step in the sequence of steps of other filters in the second subset of filters based on at least one of the other filters in the second subset of filters processing the second specific portion of content.

22. The computer program product as in claim 21, comprising:

wherein the operations for partially executing each filter in the first subset of filters in parallel include operations for:

based on detecting that all filters in the first subset of filters with a sequence of steps that include the at least one shared step have executed the at least one shared step, deleting the output from executing the at least one shared step in the first subset of filters; and wherein partially executing each filter in the second subset of filters in parallel include operations for:

based on detecting that all filters in the second subset of filters with a sequence of steps that include the at least one shared step have executed the at least one shared step, deleting the output from executing the at least one shared step in the second subset of filters.

23. The computer program product as in claim 22, comprising:

until all filters in the set of filters have been completely executed, repeating the operations for:

continuing execution of each filter in the first subset of filters in parallel;

suspending the parallel execution of each filter in the first subset of filters;

discarding output of any shared steps created during continued execution of each filter in the first subset of filters;

continuing execution of each filter in the second subset of filters in parallel; suspending the parallel execution of each filter in the second subset of filters; and discarding output of any shared steps created during continued execution of each filter in the second subset of filters.

24. A computer system comprising:

a processor;

a memory unit that stores instructions associated with an application executed by the processor; and an interconnect coupling the processor and the memory unit, enabling the computer system to execute the application and perform operations of:

receiving an identification of a set of filters to be applied to content, each filter in the set of filters comprising a sequence of steps;

identifying at least one shared step common to the sequence of steps of a first filter and at least one second filter in the set of filters, wherein the first filter and the at least one second filter are configured to receive identical inputs and to generate different outputs; and applying the set of filters to the content by replacing a second execution of the at least one shared step by the at least one second filter using an output of a first execution of the at least one shared step by the first filter, wherein the second execution is replaced based on the first execution being performed.

* * * * *